(12) United States Patent
Davis et al.

(10) Patent No.: US 9,762,406 B2
(45) Date of Patent: Sep. 12, 2017

(54) MODULAR WIRELESS POWER, LIGHT AND AUTOMATION CONTROL WITH USER VERIFICATION

(71) Applicant: Kortek Industries Pty Ltd, Brisbane (AU)

(72) Inventors: Barrie Davis, Sanctuary Cove (AU); Benjamin Davis, Alderley (AU)

(73) Assignee: Kortek Industries Pty Ltd, Brisbane (AU)

( * ) Notice: Subject to any disclaimer, the term of this patent is extended or adjusted under 35 U.S.C. 154(b) by 0 days.

(21) Appl. No.: 15/038,043

(22) PCT Filed: Nov. 27, 2014

(86) PCT No.: PCT/AU2014/050383
§ 371 (c)(1),
(2) Date: May 20, 2016

(87) PCT Pub. No.: WO2015/077842
PCT Pub. Date: Jun. 4, 2015

(65) Prior Publication Data
US 2016/0301542 A1    Oct. 13, 2016

(30) Foreign Application Priority Data
Nov. 28, 2013    (AU) .............................. 2013904606

(51) Int. Cl.
*H04L 12/28*    (2006.01)
*G08C 17/02*    (2006.01)
(Continued)

(52) U.S. Cl.
CPC .......... *H04L 12/2816* (2013.01); *G08C 17/02* (2013.01); *H04L 67/104* (2013.01);
(Continued)

(58) Field of Classification Search
CPC ... H04L 12/2816; H04L 12/08; H04L 67/104; H04W 4/008; H04W 37/0272; H04M 1/0202; G08C 17/02
See application file for complete search history.

(56) References Cited

U.S. PATENT DOCUMENTS

| | | | |
|---|---|---|---|
| 5,909,183 | A | 6/1999 | Borgstahl et al. |
| 6,069,896 | A | 5/2000 | Borgstahl et al. |

(Continued)

FOREIGN PATENT DOCUMENTS

| | | |
|---|---|---|
| EP | 2154662 A2 | 2/2010 |
| EP | 2418462 A1 | 2/2012 |

(Continued)

OTHER PUBLICATIONS

HomeTheaterForum: "Logitech Harmony Link Review Part 1 of 2)", https://www.youtube.com/watch?v=NGIE-zF7Rg0, uploaded Feb. 13, 2012.

(Continued)

*Primary Examiner* — Leon Flores
(74) *Attorney, Agent, or Firm* — Eagar & Martin Pty Ltd (57) ABSTRACT

A system for controlling a user's access to an electrical device (314). The system includes an interchangeable unit (200) operable for wireless communication with a mobile communications device (10), a power control unit (300) having a communications interface (302), and an external network processor configured to receive a verification request to verify that a user of the mobile communications device is authorized to access the interchangeable unit. The external network processor is configured to send to the mobile communications device an authorization confirmation after the user's access to the interchangeable unit is verified as being authorized.

20 Claims, 2 Drawing Sheets

(51) Int. Cl.

| | | |
|---|---|---|
| *H05B 37/02* | (2006.01) | |
| *H04L 29/08* | (2006.01) | |
| *H04M 1/02* | (2006.01) | |
| *H04W 4/00* | (2009.01) | |
| *H04W 12/08* | (2009.01) | |
| *H04W 84/12* | (2009.01) | |
| *H04W 88/08* | (2009.01) | |

(52) U.S. Cl.
CPC ......... *H04M 1/0202* (2013.01); *H04W 4/008* (2013.01); *H04W 12/08* (2013.01); *H05B 37/0272* (2013.01); *H04L 2012/2841* (2013.01); *H04W 84/12* (2013.01); *H04W 88/08* (2013.01); *Y02B 20/445* (2013.01)

(56) References Cited

U.S. PATENT DOCUMENTS

| | | |
|---|---|---|
| 6,585,596 B1 | 7/2003 | Leifer et al. |
| 6,803,728 B2 | 10/2004 | Balasubramaniam et al. |
| 7,024,501 B1 | 4/2006 | Wright |
| 7,964,989 B1 | 6/2011 | Puschnigg |
| 8,290,515 B2 | 10/2012 | Staton |
| 8,478,450 B2 | 7/2013 | Lu et al. |
| 9,319,234 B2 | 4/2016 | Davis et al. |
| 2005/0096753 A1 | 5/2005 | Arling et al. |
| 2005/0174962 A1 | 8/2005 | Gurevich et al. |
| 2005/0219208 A1 | 10/2005 | Eichenberger et al. |
| 2006/0028997 A1 | 2/2006 | McFarland |
| 2007/0263600 A1 | 11/2007 | Sutardja et al. |
| 2007/0290793 A1 | 12/2007 | Tran |
| 2007/0293208 A1 | 12/2007 | Loh et al. |
| 2008/0143493 A1 | 6/2008 | Nam et al. |
| 2008/0218148 A1 | 9/2008 | Robertson et al. |
| 2009/0058635 A1 | 3/2009 | LaLonde et al. |
| 2009/0316671 A1 | 12/2009 | Rolf et al. |
| 2010/0031295 A1 | 2/2010 | Krzyzanowski et al. |
| 2010/0070217 A1 | 3/2010 | Shimada et al. |
| 2010/0271802 A1 | 10/2010 | Recker et al. |
| 2010/0297941 A1 | 11/2010 | Doan et al. |
| 2011/0026504 A1 | 2/2011 | Feinberg |
| 2011/0050451 A1 | 3/2011 | Mierta |
| 2011/0065458 A1 | 3/2011 | Staton et al. |
| 2011/0173313 A1 | 7/2011 | Owhadi et al. |
| 2011/0225305 A1 | 9/2011 | Vedantham et al. |
| 2011/0243151 A1 | 10/2011 | Diab et al. |
| 2011/0311052 A1 | 12/2011 | Myers et al. |
| 2012/0086563 A1 | 4/2012 | Arling et al. |
| 2012/0091804 A1 | 4/2012 | Altonen et al. |
| 2012/0136780 A1 | 5/2012 | El-Awady et al. |
| 2012/0178367 A1 | 7/2012 | Matsumoto et al. |
| 2013/0083805 A1 | 4/2013 | Lu et al. |
| 2013/0085620 A1* | 4/2013 | Lu ................ H04L 12/2807 700/286 |
| 2013/0142181 A1 | 6/2013 | Makim et al. |
| 2014/0244044 A1 | 8/2014 | Davis et al. |
| 2014/0244045 A1 | 8/2014 | Davis et al. |
| 2014/0244063 A1 | 8/2014 | Davis et al. |
| 2015/0005900 A1* | 1/2015 | Steele ................ G05B 15/02 700/19 |
| 2015/0056979 A1 | 2/2015 | Davis et al. |
| 2015/0287041 A1 | 10/2015 | Davis et al. |

FOREIGN PATENT DOCUMENTS

| | | |
|---|---|---|
| WO | 2005084339 | 9/2005 |
| WO | 2012109696 A1 | 8/2012 |
| WO | 2013067569 A1 | 5/2013 |
| WO | 2013163674 A1 | 11/2013 |

OTHER PUBLICATIONS

"Mixed-Mode WLAN: Integration of Ad Hoc Mode with Wireless LAN infrastructure" IEEE GLOBECOM 2003, pp. 231-235, Chen et al.

GlobalPlatform Card Contactless Services Card Specification v2.2—Amendment C Version 1.1, Public Release Apr. 2013, Document Reference GPC_SPE_025. [ Retrieved from the Internet on Feb. 2, 2015]<URL: https://web.archive.org/web/20131023062336/ http://www.globalplatform.org/specificationform.asp?fid=7776 > Published on Oct. 2013 as per Wayback Machine Section 12.

Android Developers, Host-based Card Emulation, [ Retrieved from the Internet on Feb. 3, 2015] <URL: https://web.archive.org/web/20131110234342/https://developer.android.com/guide/topics/connectivity/nfc/hce.html > Published on Nov. 10, 2013 as per Wayback Machine.

* cited by examiner

MODULAR WIRELESS POWER, LIGHT AND AUTOMATION CONTROL WITH USER VERIFICATION

CROSS REFERENCE TO RELATED APPLICATIONS

This application is related to International Application No. PCT/AU2013/000260, titled "Modular Wireless Power, Light and Automation Control," filed 15 Mar. 2013; and Australian Application No. 2013204671, titled "Wireless Power, Light and Automation Control with Ambient Light and Proximity Detection," filed 12 Apr. 2013. The entire contents of each of the above-identified applications is hereby incorporated by reference herein.

FIELD OF INVENTION

The present invention generally relates to the control of mains power, lighting and automation in domestic and commercial applications by allowing a standard smartphone, tablet or similar item to act as a personal controller using a modular wireless peer-to-peer communications link.

BACKGROUND OF INVENTION

Many residential and commercial buildings have electrical power, lights, doors, gates, shutters, awnings, vending and blind mechanisms that can be operated or programmed using buttons, switches or remote controls. In some instances these devices can perform tasks automatically based on the amount of ambient light detected or according to a pre-programmed schedule.

In recent years, the proliferation of smartphones has placed powerful computing devices in the hands of the public. While these devices can generate and transmit wireless control commands, their generic wireless systems are not compatible with the standards currently used in domestic or commercial appliances and mechanisms, so they cannot natively communicate with such in order to transfer programming and/or control commands.

Smartphones typically have an operational life of two years while controllable power, light, door, gate, awning, vending and blind mechanisms usually have an operational life greater than ten years. The rapid turnover of smartphones places pressure on manufacturers to continually improve each successive generation. Smartphones therefore tend to integrate the latest communication technology in order to remain competitive. With no unified standard specifying a generic smartphone communication platform, the communication technology one manufacturer chooses may not be adopted by all manufacturers. Alternately, one manufacturer may choose to add restrictions around their communication capabilities that others do not, or may adopt new technology that is not compatible with previous standards.

It can be appreciated that manufacturers of controllable power, light, door, gate, shutter, fan, awning, vending and blind mechanisms may find it highly advantageous for customers to control their products natively from a smartphone. The problem is that integrating the enabling technology has a cost, which increases as more components are required to address the different communication capabilities across different smartphone operating systems and handset configurations in the market. This is compounded by the fact that the long operational life of power, light, door, gate, awning, vending and blind mechanisms results in a high probability that any embedded communication standard may become obsolete before the end of the operational life of the mechanism.

SUMMARY

In one preferred embodiment, the present invention includes three parts: an interchangeable module with control and wireless communication capabilities; a power control unit with interface connection adapted to supply power and exchange commands and information with an interchangeable module; and a battery powered personal controller able to communicate with an interchangeable module via a peer-to-peer wireless communications link, it will be appreciated that reference herein to "preferred" or "preferably" is intended as exemplary only.

The interchangeable module is preferably configured to operate as a Wi-Fi Direct access point/group participant and/or a software access point (SoftAP) using Wi-Fi Direct and/or network Wi-Fi technologies, and may include additional support for Bluetooth SIG class 2.1+EDR or later, and/or Near Field Communications (NFC). As used herein, "network Wi-Fi" refers to the Wi-Fi Alliance definition as any "wireless local area network (WLAN) products that are based on the Institute of Electrical and Electronic Engineers (IEEE) 802.11 standards" including any amendments, extensions or proprietary implementations. As used herein, the term "Wi-Fi Direct" refers to a device configured to support the Wi-Fi Alliance Wi-Fi Direct specification and amendments, extensions or proprietary implementations of Wi-Fi peer-to-peer technology.

Wi-Fi Direct and Bluetooth are peer-to-peer communication technologies. Peer-to-peer communication methods that may be incorporated into the interchangeable module are described in more detail in PCT Application No. PCT/AU2011/001666, filed Dec. 29, 2011, titled "Wireless Power, Light and Automation Control," the entire disclosure of which is incorporated herein by reference.

The personal controller is preferably a commercially available cellular or mobile phone commonly known as a smartphone that supports at least network Wi-Fi and may also support Wi-Fi Direct and/or Bluetooth and/or Near Field Communications (NFC). Unless otherwise noted, the personal controller will be described in terms of a smartphone, though the invention is not so limited. For example only, the personal controller may be any portable device which can download or install by other means an Applications Program (App), have a suitable interface the user can interact with to control the App in order to execute required functions, and have the wireless communications capability to establish communications with a power control unit. Examples of personal controllers include smartphones, tablets, laptops, ultrabooks, notebook personal computers, and wearable items such as eyewear and wrist devices having personal processors.

The interchangeable module can preferably form a peer-to-peer communications link with a smartphone using Wi-Fi Direct by simulating a Wi-Fi access point or negotiating a Direct connection. It can be appreciated that an interchangeable module operating in Wi-Fi Direct mode can communicate directly with a smartphone without the requirement of a MAN. The interchangeable module preferably simulates a Wi-Fi access point via a SoftAP if the smartphone is not using Wi-Fi Direct to communicate, allowing the smartphone to connect peer-to-peer to an interchangeable module in the same way it would otherwise connect to a standard Wi-Fi access point. Where the smartphone uses Wi-Fi Direct to communicate, the interchangeable module and smartphone preferably negotiate which will assume the Wi-Fi Direct group owner role and establish a Wi-Fi Direct peer-to-peer connection. Once a connection has been established, the user is able to send commands directly to the selected interchangeable module without the need for any other device, intermediary or network. The use of the IEEE802.11 Independent Basic Service Set ad-hoc mode to form a peer-to-peer communications link between a smartphone and interchangeable module is expressly excluded.

The present invention in one preferred embodiment provides an interchangeable module with wireless communication capabilities derived from any number of radios, transceivers and controllers that provide a SoftAP and/or Wi-Fi Direct connection with the ability to optionally support Bluetooth and/or NFC. Depending on cost and desired outcome, the wireless communication capabilities may be achieved by using: any number of discrete radios, aerials, transceivers and controllers either individually, collectively, or as a system in package (SiP) or as a system on chip (SoC); a combination or "combo" chip that aggregates the functionality of a number of discrete transceivers and controllers of different standards as a SiP or SoC; or using a combination of combo chip's, SiP/s, SoC/s and/or discrete radios, aerials, transceivers and controllers. The interchangeable module may utilize single or multiple wireless bands, physical channels, virtual channels, modes or other coexistence technologies and algorithms, the methods of which are already known to those skilled in the art and are not described herein. Depending on the chosen hardware components, the interchangeable module may also include shared antenna support and shared signal receiving paths to eliminate the need for an external splitter.

An App is preferably used to configure any operational aspects and control the functional capabilities of the interchangeable module. Once a link has been established between a smartphone and interchangeable module, the user is preferably able to activate an App which can use the wireless data path. Using an App, a user can preferably set the operational parameters of an interchangeable module such as name the device, set an encryption key, enter a password, configure any Wi-Fi specific parameters or configure any other parameters that may be required or desirable. When this procedure has been completed, the user can preferably command the interchangeable module to "restart", at which time it will configure itself according to the parameters which have been specified. The interchangeable module would then only establish a communications link with smartphones that can fully comply with its connection requirements. This may include security measures in addition to any native security measures of a SoftAP and/or Wi-Fi Direct including Wi-Fi Protected Access.

In one preferred embodiment, a Bluetooth peer-to-peer connection between a smartphone and interchangeable module may be used to enter information for configuration of the interchangeable module as a SoftAP or Wi-Fi Direct access point/group participant, or to establish a SoftAP or Wi-Fi Direct peer-to-peer connection. In another preferred embodiment, a Bluetooth peer-to-peer connection between interchangeable module and smartphone may be used as a peer-to-peer communication channel to control, program or exchange data with a power control unit.

The power control unit is preferably configured with an interface connection adapted to accept an interchangeable module, a power control circuit and a microprocessor configured to vary the power supplied to an electrical apparatus through the power control circuit based at least in part on instructions communicated from the personal controller through the wireless interchangeable module. In one preferred embodiment, the power control unit may preferably include a sensor module configured to sense at least one of light and proximity, the microcontroller being configured to vary the power supplied to an electrical apparatus through the power control circuit based at least in part on instructions communicated from the personal controller through the interchangeable module, and based at least in part on a signal sent to the microcontroller by the sensor module, the signal from the sensor module being used by the microcontroller to determine the occurrence of a predetermined trigger event.

In one preferred embodiment, the power control unit may preferably be configured with power measurement and recording capabilities, the data from which can be exchanged with an App through an interchangeable module's wireless communications link.

The power control unit may have an exposed human interface such as a mechanical switch, switches, or buttons, or a capacitive/proximity touch pad or pads. In one preferred embodiment, it may be desirable to have no exposed human interface in order to reduce the incidence of vandalism or create a highly weather resistant unit.

In addition to configuring the operational aspects of the interchangeable module, an App would also preferably be used to exchange data with, control, and program various functions of the power control unit through the interchangeable module acting as a wireless communications medium. In one preferred embodiment this could include the ability to set a schedule in the power control unit for varying the power supplied to an electrical apparatus. In one preferred embodiment this could include the ability to set a specific response to an ambient light threshold determined from an embedded ambient light sensor in the power control unit. In another preferred embodiment, this could include the ability to set a specific response in relation to a proximity event determined from an embedded proximity detector in the power control unit.

In one preferred embodiment, the power control unit may preferably include additional access controls in the form of hardware, firmware or software security measures that require a successful handshake or negotiation with an App prior to the App being granted permission to access, program or control the power control unit.

The interface connection is preferably a physical connector designed specifically to allow an interchangeable module to couple with a power control unit. The interface connection preferably allows commands and information to be passed between an interchangeable module and power control unit. In one preferred embodiment, the interface connection may also preferably supply power from the power control unit to the interchangeable module in order for the interchangeable module to run its systems.

It can be appreciated that the power control unit and interface connection can be incorporated into many forms of power, light and automation control systems, appliances and applications where wireless communication with a smartphone is advantageous, but where the permanent embedding of a wireless communication standard may be undesirable. Examples include, but are not limited to: door mechanisms, gate mechanisms, motorized blind and awning mechanisms, motorized screen mechanisms, light switches, lighting controllers, power control mechanisms, climate control equipment such as thermostats and air conditioning units, fans, vending machines, sprinkler and watering systems, pumps, pool filtration systems, gas metering and control equipment, electricity meters, peripheral computer equipment, consumer electronics, whitegoods, vehicles, and alarm systems.

In one preferred embodiment, the interface connection can be performed by using a Universal Serial Bus (USB) plug/receptacle; however it can be appreciated that other suitable interfaces can be used without departing from the true scope and spirit of the invention. By way of example only, a totally weatherproof interface connection could be achieved by preferably using a wireless power transfer coupling such as near-field magnetic resonance or field-coupled wireless power transmission combined with an optical data link instead of a USB interface. By way of another example, interface connection could be achieved by way of power transfer coupling such as near-field magnetic resonance or field-coupled wireless power transmission combined with short range wireless transceivers running half or full duplex. By way of another example, power and data coupling could be achieved entirely by way of metal contacts.

In another preferred aspect, the present invention provides a system for controlling a user's access to an electrical device or system. The system includes an interchangeable unit operable for wireless communication with a mobile communications device, the interchangeable unit including an aerial and a radio transceiver, the radio transceiver being configured to communicate with the mobile communications device using a peer-to-peer communications standard. The system further includes a power control unit having a communications interface for communication with the interchangeable unit, a microcontroller, and a power control circuit, the power control circuit being configured to implement a command from the microcontroller to vary power from a mains power connection to the electrical device or system, the microcontroller being configurable by the mobile communications device through the interchangeable unit and the communications interface. The system also includes an external network processor accessible over a communications network, the external network processor being configured to receive a verification request from the mobile communications device to verify that a user of the mobile communications device is authorised to access the interchangeable unit. The external network processor is configured to send, to the mobile communications device, an authorisation confirmation after the user's access to the interchangeable unit is verified as being authorised.

In another preferred aspect, the present invention provides for a method for reconfiguring, with a mobile communications device and an interchangeable unit in wireless communications with the mobile communications device, a power control unit adapted to vary power to an electrical device or system. The method includes: validating a user's access to the interchangeable unit; sending, over a communications network, a confirmation to the mobile communications device that the user is authorised to access the interchangeable unit after the user's access is validated; moving the interchangeable unit in close proximity to the power control unit, the power control unit having a microcontroller and a power control circuit configured to vary power to the electrical device or system; receiving, at the interchangeable unit, a command from the mobile communications device to reconfigure the microcontroller of the power control unit after the user's access to the interchangeable unit is validated; and reconfiguring the microcontroller of the power control unit in accordance with the command received at the interchangeable unit.

DETAILED DESCRIPTION OF THE DRAWINGS

Alternative embodiments of the invention will be apparent to those skilled in the art from consideration of the specification and practice of the invention disclosed herein. It is intended that the specification and examples be considered as exemplary only, with a true scope and spirit of the invention being indicated by the claims which follow.

Figure 1:
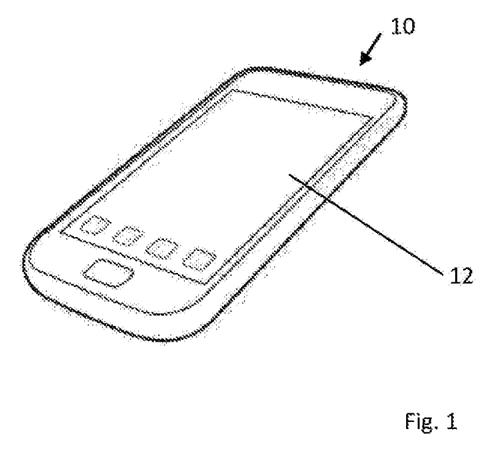
FIG. 1 is a perspective view of a smartphone for use in one preferred embodiment of the present invention.

FIG. 1 is a perspective representation of a smartphone 10 which uses a wireless link to communicate with a power control unit through an interchangeable module (described in more detail below). Smartphone 10 is preferably a commercially available, conventional smartphone. Some of the basic functions the smartphone preferably includes are: a touch sensitive graphical screen interface 12; a compatible radio transceiver; and the ability to run an App specific to the individual smartphone that provides a means for configuring an interchangeable module and a control interface for a power control unit. In the examples that follow, specific coding for each App has been omitted for simplicity as a person of ordinary skill in the art would be able to understand and reproduce the functionality of the described embodiments without the need for a discussion on particular coding.

Smartphone 10 is preferably configured to operate across a range of wireless communications technologies, including the technology to communicate via at least network Wi-Fi. Smartphone 10 may additionally include support for Wi-Fi Direct and/or Bluetooth and/or NFC. While preferred embodiments of the present invention use a smartphone as its controller, and specifically a smartphone incorporating at least network Wi-Fi, other wireless communications methods and systems could be used depending on the specific requirements of the application of the invention.

Figure 2:
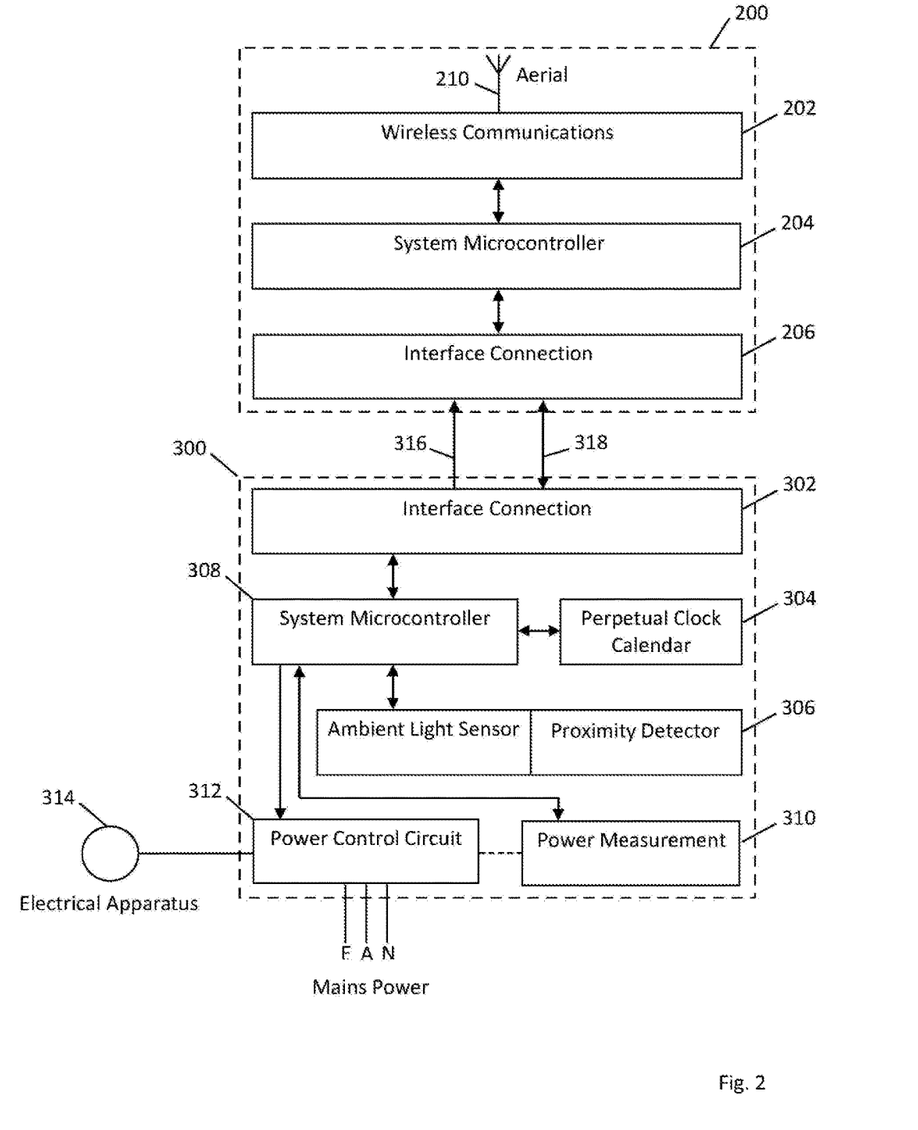
FIG. 2 is a block diagram of the functional elements of a power control unit and interchangeable module in accordance with one preferred embodiment of the present invention.

Referring now to FIG. 2, a preferred embodiment of the present invention is shown with interchangeable module 200, power control unit 300 and an interdependent interface connection.

Interchangeable module 200 preferably has wireless communications 202, system microcontroller 204 with embedded memory, interface connection 206, and an aerial 208. In some preferred embodiments, it may be preferable for system microcontroller 204 to support external memory in addition to, or instead of, embedded memory.

The commands and responses between system microcontroller 204 and smartphone 10 are communicated through a radio frequency wireless link supported by wireless communications 202 and aerial 208. Wireless communications 202 preferably includes any number of radios, transceivers and controllers that provide a SoftAP and/or Wi-Fi Direct connection with the ability to optionally support Bluetooth. Examples of wireless communications are described in PCT Application No. PCT/AU2012/000959, titled "Adaptable Wireless Power, Light and Automation System", filed Aug. 15, 2012, the entire contents of which is incorporated by reference herein. Depending on cost and the desired operational functions, wireless communications 202 may include only a Wi-Fi radio, a combination of Wi-Fi radios, or any combination of: Wi-Fi Radio/s, wireless radio/s; and a Bluetooth radio. The wireless communication capabilities may be achieved by using: any number of discrete radios, aerials, transceivers and controllers either individually, collectively or as a SiP or SoC; a combination or "combo" chip that aggregates the functionality of a number of discrete transceivers and controllers of different standards as a SIP or SoC; or using a combination of combo chip/s, SIP/s, SoC/s and/or discrete radios, aerials, transceivers and controllers. The interchangeable module may utilize single or multiple wireless bands, physical channels, virtual channels, modes or other coexistence technologies and algorithms, the methods of which would be understood by those skilled in the art and are not described herein. Depending on the chosen hardware components, the interchangeable module may also include shared antenna support and shared signal receiving paths to eliminate the need for an external splitter.

When wireless communications 202 operates using a peer-to-peer Wi-Fi standard, preferably Wi-Fi Direct, it can communicate with devices that support network Wi-Fi or Wi-Fi Direct on a peer-to-peer basis without the need for any intermediary hardware. Wireless communications 202 is preferably configured to operate according to the Wi-Fi Direct specification as both a Wi-Fi Direct group participant and Wi-Fi Direct access point or SoftAP, allowing the interchangeable module to appear to network Wi-Fi devices during discovery as a Wi-Fi access point. After being discovered as a Wi-Fi Direct access point or SoftAP, a Wi-Fi Direct device is able to communicate peer-to-peer with network Wi-Fi devices that support the IEEE 802.11 specification as amended from time to time. In this instance, a network Wi-Fi device will receive a device discovery message from the interchangeable module as if from a Wi-Fi access point and be able to establish a peer-to-peer communications link with the interchangeable module as though it were connecting to a standard Wi-Fi access point. The procedure of establishing a communications link between a Wi-Fi Direct device and network Wi-Fi devices are defined in the Wi-Fi Alliance specifications and would be understood by practitioners skilled in communications systems protocols.

As smartphones continue to evolve, new models are starting to include support for Wi-Fi Direct in addition to network Wi-Fi. In one preferred embodiment, where an interchangeable module receives a Wi-Fi Direct response to a device discovery message, the smartphone and interchangeable module will negotiate which device will assume the role of group owner in accordance with the Wi-Fi Alliance Wi-Fi Direct specification, and a peer-to-peer Wi-Fi Direct communication link will be established. The Wi-Fi Direct specification allows any Wi-Fi Direct device to be a group owner, and depending on the capabilities of the device, the negotiation procedure determines the most suitable device to perform this role.

Wi-Fi Direct has a number of advantages which simplify communications between an interchangeable module and a smartphone operating as a controller. Significant advantages include mobility and portability, where a smartphone and interchangeable module only need to be within radio range of each other to establish a wireless communications link. Wi-Fi Direct offers secure communications through means such as Wi-Fi Protected Access protocols and encryption for transported messages, ensuring the system remains secure to qualified devices. Most importantly, an interchangeable module running Wi-Fi Direct or a SoftAP allows a smartphone with only network Wi-Fi to engage in peer-to-peer data exchange with an interchangeable module even though the smartphone network Wi-Fi was never intended to support on-demand, peer-to-peer communications. This is a distinct departure from the ad-hoc mode of network Wi-Fi that requires both the smartphone and interchangeable module to be configured for ad-hoc mode while also using the same SSID and same channel number.

System microcontroller 204 preferably incorporates a firmware program which defines the operation and functions of interchangeable module 200 and assumes responsibility for running all program code and system elements, including specifying and controlling the operation of wireless communications 202 and facilitating data exchanges between a power control unit 300 and an App running on smartphone 10 through data connection 318. System microcontroller 204 preferably includes a non-volatile memory to store any program data received from an App. In some preferred embodiments, more than one microcontroller may be used.

When interchangeable module 200 is manufactured, system microcontroller 204 preferably holds the firmware to operate interchangeable module as a Wi-Fi Direct access point/group participant. When power is applied to the interchangeable unit for the first time, system microcontroller 204 preferably starts wireless communications 202 in Wi-Fi Direct mode and begins transmitting discovery messages that can be detected by a smartphone within wireless range.

It can be appreciated that an interchangeable module operating as a Wi-Fi Direct access point/group participant can communicate directly with a smartphone without needing a Wi-Fi WLAN. Interchangeable module 200 either appears as a Wi-Fi access point if smartphone 10 is not using Wi-Fi Direct to communicate; or negotiates with smartphone 10 as to which device will assume a Wi-Fi Direct group owner role if smartphone 10 is using Wi-Fi Direct to communicate. The user is then able to establish a peer-to-peer communications link and send commands or exchange data directly with the selected interchangeable module, and through the interchangeable module with a power control unit 300, without the need for any other device.

In one preferred embodiment, wireless communications 202 may be configured to preferably simulate a Wi-Fi access point or operate as a SoftAP without support for Wi-Fi Direct. In that case, a smartphone would preferably be able to establish a peer-to-peer communications link with interchangeable module 200 as if connecting to a Wi-Fi access point, but could not negotiate with the interchangeable module a Wi-Fi Direct connection even if smartphone 10 supported Wi-Fi Direct.

A preferred method for configuring an interchangeable module 200 and controlling a power control unit 300 is facilitated through a related Product App. Installation instructions for the Product App are preferably included with the interchangeable module or power control unit. The Product App preferably adopts the same centralized app store installation methods common to all smartphone platforms.

Referring to FIG. 1, in one preferred embodiment, smartphone 10 may be capable of determining from an interchangeable modules wireless signal a product identifier allowing the smartphone to automatically download the interchangeable module's related Product App from the appropriate app store.

The Product App preferably communicates with any mix of wireless elements and radio technologies to seamlessly provide the best communications link with an interchangeable module. In one preferred embodiment, the Product App preferably controls smartphone 10 wireless communications in order to initiate, search and establish a wireless communications link with an interchangeable module 200. The Product App preferably displays preconfigured and new interchangeable modules via graphical elements on smartphone touch screen 12.

When the Product App starts, it preferably scans for interchangeable modules within range and identifies any new interchangeable modules that need to be initially configured. At this point, if a peer-to-peer connection has not already been established between the smartphone and the desired new interchangeable module, the Product App preferably allows the user to establish a peer-to-peer connection with the desired new interchangeable module. The Product App then preferably leads the user through a series of data inputs using the smartphone's touch screen 12 as a human interface. The Product App communicates with system microcontroller 204 and replaces the general parameters used for the initial connection to specific parameters which define the interchangeable module as a unique device. These may include: setting a unique encryption key so all data transfers between the interchangeable module and the smartphone are protected; setting the interchangeable module name to a unique, easily recognisable identifier, e.g., from a product name such as "Interchangeable module" to "John's Wireless Key"; and setting a password in the interchangeable module used to establish a secure link with a smartphone.

The Product App preferably maintains a record of these specific parameters in the smartphone memory for future identification of, and connection to, the new interchangeable module.

Once the setup procedure is complete, the Product App preferably commands the interchangeable module firmware to "restart". When the applications firmware restarts, the interchangeable module will use the user specified data to create its own unique identity. The smartphone which was used to set this identity will be able to automatically connect to that interchangeable module because the new specific parameters are known. Where the smartphone operating system allows, the Product App can then be used to preferably automatically establish a communications link with the interchangeable module each time the user selects that particular device in the Product App.

Once an interchangeable module has been configured, any other smartphone can only connect with it if the user knows the specific parameters that are now unique to that particular interchangeable module. If a second smartphone searches for Wi-Fi access points or Wi-Fi Direct devices, it will see the configured interchangeable module with the characteristic that it is "secure". To connect to it, the user will have to know the specific password allocated to that interchangeable module, otherwise it will not be able to establish a communications link. If the password is known and entered into the smartphone when requested, a communication link between the second smartphone and the interchangeable module will be established.

The Product App is still preferably required to control a power control unit 300 which may have additional security requirements depending on the nature of the application. In one preferred embodiment, a power control unit 300 may preferably include access controls in the form of hardware, firmware or software security measures that require a successful handshake or negotiation with the Product App prior to the Product App being granted permission to access, program or control a power control unit. By way of example only, this may be by way of a simple password that the Product App exchanges with a power control unit that the power control unit verifies against a password held in its memory. Where a Product App and power control unit successfully negotiate a secure connection, the Product App preferable stores the necessary parameters used to establish the connection in the Product App memory and may use those parameters to automatically complete subsequent handshakes.

In one preferred embodiment, the interchangeable module rather than Product App may preferably be responsible for completing a secure handshake or negotiation with a power control unit prior to the Product App being granted permission to access, program or control the power control unit.

In one preferred embodiment, the security measures of the power control unit may preferably cause the power control unit to temporarily disable all communications for a period of time after a defined number of attempts to establish a communications channel have failed to meet the requirements of the security measures. By way of example only, even though smartphone 10 and interchangeable module 200 may have formed a secure wireless communications link, entering an incorrect pin number three times in the Product App required for power control unit 300 to form a secure communications link with interchangeable module 200 could cause power control unit 300 to suspend all further attempts at establishing a communications link with any interchangeable module for 24 hrs.

The operating parameters for interchangeable module 200 are preferably retained by system microcontroller 204 in non-volatile memory after power has been disconnected. When power is restored, system microcontroller 204 powers up with all of the operating parameters and programming as previously operating before power was removed, restoring the appropriate operating parameters from non-volatile memory. Thus, system microcontroller 204 preferably is configured with an adapted default setting which remembers (stores) the last change.

It is envisaged that there may be times when an interchangeable module 200 may need to be completely reset. The Product App is preferably able to communicate with an interchangeable module and command it to re-initialise to a factory default configuration. In this case, all user-defined parameters that were loaded into the interchangeable module are lost and it is returned to its factory default state, ready to receive new user-defined parameters.

It is envisaged that there may be times when power control unit 300 may need to be completely reset. The Product App is preferably able to wirelessly communicate with a power control unit 300 through interchangeable module 200 and command the power control unit to re-initialise to a factory default configuration. In this case, all user-defined parameters that were loaded into the power control unit are lost and it is returned to its factory default state, ready to receive new user-defined parameters.

In one preferred embodiment, where a interchangeable module has an exposed human interface such as a mechanical switch, switches, button, buttons, or a capacitive/proximity touch pad or pads, a user may preferably use a human interface element to cause the interchangeable module or a power control unit to re-initialise to the factory default configuration or reboot the system without the use of a smartphone or Product App.

In one preferred embodiment, the re-initialisation to a factory default configuration or rebooting of interchangeable module 200 or power control unit 300 may preferably require a combination of instructions from the Product App and physical interaction with a human interface such as touch pads, buttons or switches.

In one preferred embodiment, wireless communications 202 may include Bluetooth communication capabilities in addition to Wi-Fi Direct and/or SoftAP capabilities. A peer-to-peer Bluetooth communication link between smartphone 10 and interchangeable module 200 may be used by the Product App to enter parameters for establishing a Wi-Fi Direct and/or SoftAP communications link; or open a Wi-Fi Direct and/or SoftAP communications link; or may in its own right operate as a peer-to-peer communications link for exchange of data between the Product App and power control unit 300. In one preferred embodiment, the Product App may preferably allow a user to specify Bluetooth as the preferred peer-to-peer communication method between interchangeable module 200 and smartphone 10. Similarly, NFC can be included and used where desirable.

In one preferred embodiment, interchangeable module 200 may incorporate a human interface such as a button, switch, capacitive pad, or proximity sensor that may facilitate the secure initialization of a wireless peer-to-peer connection.

In one preferred embodiment, the interchangeable module may include NFC capability that the Product App could use to automatically establish a Wi-Fi Direct, Bluetooth or other peer-to-peer communications link with smartphanes that support NFC. This process is commonly referred to as "bootstrapping" and is an established method for initializing communications known by those skilled in the art.

In one preferred embodiment, it may be highly desirable to remotely disable a Product Apps ability to communicate with an interchangeable module 200 as a way of preventing access to associated power control units. By way of example only, this may be advantageous where a facility manager decides it is no longer desirable to allow an interchangeable module used by a maintenance worker to access and program various power control units responsible for lighting in a park.

The Product App may preferably include the capability to identify individual users through unique fields or parameters within the Product App. Prior to establishing a wireless communications link with an interchangeable module, Product App may preferably access an external server using the smartphone communications to verify with the external server that the fields or parameters in the Product App that uniquely identify an individual user remain authorized. Where the details reported by the Product App are determined by the server to be authorized, the server may preferably send a confirmation response to the Product App allowing the Product App to establish a wireless communications link with an interchangeable module. Where the fields or parameters reported by the Product App are not within the server's authorized database, the server may preferably send a command to the Product App preventing it from establishing a wireless communications link with any interchangeable module and may preferably cause the Product App to erase all data stored in the Product Apps memory. Depending on the level of security desired, this operation could be performed before establishing every wireless communication link with an interchangeable module, or could be performed on a more general basis, such as, by way of example only, once per day, week or month.

A number of different security measures could be implemented without departing from the scope of present invention. In one preferred embodiment, where the Product App determines from an external server that an individual user no longer remains authorized, Product App may preferably allow the user to establish a wireless connection with a known interchangeable module allowing the Product App to send a "lock" command to the interchangeable module permanently disabling the interchangeable module from communicating with any power control unit.

It will be appreciated that the steps described above may be performed in a different order, varied, or certain steps added or omitted entirely without departing from the scope of the present invention. It will also be appreciated by those of ordinary skill in the art that the system described above can be varied in many ways without departing from the scope of the present invention. By way of example only, where the smartphone operating system does not allow the Product App to control the smartphone wireless communications in order to establish a peer-to-peer link with an interchangeable module, the user may use any mechanism provided by the smartphone to establish a wireless peer-to-peer communication link with an interchangeable module prior to starting the Product App. By way of another example only, elements of wireless communications 202 and system microcontroller 204 may be aggregated or separated into single components, SoCs or SiPs. By way of another example, where a smartphone uses a proprietary implementation of peer-to-peer Wi-Fi or an adaptation of Wi-Fi Direct, the interchangeable module may preferably incorporate the necessary hardware, firmware and/or software to execute the handshake, authentication, negotiation or configuration requirements particular to that proprietary implementation of peer-to-peer Wi-Fi or adaptation of Wi-Fi Direct in order to successfully form a wireless communications link between the interchangeable module and smartphone.

With continued reference to FIG. 2, a power control unit 300 is shown in accordance with a preferred embodiment of the present invention. Power control unit 300 has interface connection 302, perpetual clock calendar 304, sensor module 306, system microcontroller 308 with embedded memory, power measurement 310, and power control circuit 312. In some preferred embodiments, it may be preferable for system microcontroller 308 to support external memory in addition to, or instead of, embedded memory.

Perpetual clock calendar 304 preferably includes a power backup by the way of a battery or supercapacitor enabling real time to be accurately maintained in instances where a mains power outage occurs. The absolute time and date parameters of perpetual clock calendar 304 are preferably synchronized with smartphone 10 time and date parameters when a communications link is established. In some preferred embodiments, perpetual clock calendar 304 may be omitted where power control unit 300 does not perform any clock or date dependant operations. In some preferred embodiments, perpetual clock calendar 304 may be integrated into system microcontroller 308.

In one preferred embodiment, power control circuit 312 preferably includes a suitable physical interface, such as terminal block, allowing power control unit 300 to be directly integrated into the electrical mains of a budding or structure, or the electrical system of a vehicle or boat. In one preferred embodiment, power control circuit 312 preferably includes a suitable physical interface for connecting an electrical apparatus 314 to power control unit 300. It will be appreciated that power control unit 300 may be configured according to the current and voltage requirements of various countries or applications without departing from the scope of the present invention.

In one preferred embodiment, power control unit 300 may be wholly integrated into an electrical apparatus, such as, by way of example, door mechanisms, gate mechanisms, motorized blind and awning mechanisms, motorized screen mechanisms, light switches, lighting controllers, power control mechanisms, climate control equipment such as thermostats and air conditioning units, fans, vending machines, sprinkler and watering systems, pumps, pool filtration systems, gas metering and control equipment, electricity meters, peripheral computer equipment, consumer electronics, whitegoods, and alarm systems.

Interface connection 302 is preferably a physical medium adapted specifically to allow interchangeable module 200 through interface connection 206 to couple with power control unit 300 and establish a data connection 318 and power connection 316. The coupling of interface connection 206 and interface connection 302 preferably forms a conduit for the exchange of complex commands, control information and data between system microcontroller 204 in interchangeable module 200 and system microcontroller 308 in power control unit 300 via data connection 318.

The mechanical and electrical connection between an interchangeable module 200 and power control unit 300 is preferably adapted to: be extremely reliable; have adequate signal connections; be sufficiently flexible to meet different system requirements; and be easy to use. It can be appreciated that many coupling systems meet these requirements and that a suitable coupling system may be implemented to meet the operational requirements of a specific application.

In one preferred embodiment, the coupling integrated into interchangeable module 200 interface connection 206 and power control device 300 interface connection 302 may preferably be a Universal Serial Bus (USB) Standard Type A plug/receptacle as specified by the USB Implementers Forum. The USB Standard Type A plug/receptacle specifies two power pins (Vcc and ground) and two signal pins (Data+ and Data−). The power control unit preferably provides the interchangeable module with power via USB Standard Type A Socket pins 1 and 4 and exchanges data via pins 2 and 3. Asynchronous signalling methods and protocols, similar to that used by dial-up modems, through to high speed packet data techniques used by certified USB devices or similar could be supported.

In another preferred embodiment, the USB Standard Type A plug/receptacle may be substituted by a USB micro-B USB 3.0 plug/receptacle that provides ten physical connections between a power control unit and interchangeable module. Without limiting the scope of the present invention, a pin can be allocated far Vcc and two pins for ground, leaving seven signal interconnections that can provide simple control signals for level sensitive exchange of information through to a mixture of serial and parallel data transfers depending on the application.

While USB connectors offer a convenient coupling interface, the current invention is not so limited. It will be appreciated that the interconnection methods between interchangeable module 200 and power control unit 300 may be performed by a range of different plug and receptacle types or coupling techniques without departing from the scope of the present invention. By way of example only, a weatherproof and wireless interface connection could be achieved by using wireless power transfer such as near-field magnetic resonance or field-coupled wireless power transmission to provide power connection 316 combined with an optical data link or short range half-duplex wireless to provide data connection 318.

In one preferred embodiment, interchangeable module 200 may be entirely self powered and not require power connection 316.

With continued reference to FIG. 2., system microcontroller 308 preferably incorporates a firmware program which defines the operation and functions of power control unit 300 and assumes responsibility for running all program code and system elements, including interrogation of the perpetual clock calendar 304, control and management of the sensor module 306, interrogation of power measurement 310, operation of power control circuit 312 and exchange of data with an interchangeable module 200 through data connection 318. System microcontroller 308 preferably includes a non-volatile memory to store any program data. In some preferred embodiments, perpetual clock calendar 304 may be an embedded function of system microcontroller 308. In some preferred embodiments, non-volatile memory may be external to system microcontroller 308. In some preferred embodiments, more than one microcontroller may be used.

The user can, using the Product App in its simplest form, command system microcontroller 308 through a wireless communications link between smartphone 10 and interchangeable module 200, and through an interface connection between interchangeable module 200 and power control device 300, to actuate power control circuits 312 to supply, or disconnect, electrical power to electrical apparatus 314. The Product App is also preferably configured to program power control unit 300 with more complex functions and scheduling. Programmed, time dependant operations are preferably executed by system microcontroller 308 as a timed sequence from a trigger event, such as a countdown timer, or as a specified task at a predetermined date and/or time of day for a continual or defined period. Single or multiple daily start and stop times, selected day timers, repetition timers, weekly timers, combinational timers, specific date timers and many other functions are all possible and contemplated within the scope of the present invention.

In one preferred embodiment, system microcontroller 308 may preferably be configured with a sunrise/sunset algorithm or astronomical algorithm allowing the time of sunrise or sunset for any given day to be calculated based on the geographic location of power control unit 300. The geographic location of a power control unit can be determined from a location manually chosen or entered by a user in the Product App, or the Product App may ascertain its absolute geographical location from the generic location reporting services of smartphone 10. The ability for an app to ascertain its absolute geographical location from the generic location reporting services of a smartphone is already known to those skilled in the art and is not described herein. The Product App is preferably configured to transfer longitude and latitude values to system microcontroller 308 allow it to calculate sunrise and sunset times for the given location using the sunrise/sunset algorithm or astronomical algorithm. In that way, a user can schedule or program a power control unit 300 according to sunrise and sunset without having to know the absolute times or variations in times from day to day. Examples of methods for scheduling the control of power based on geographic location are described in more detail in PCT Application No. PCT/AU2012/000959, titled "Adaptable Wireless Power, Light and Automation System", filed Aug. 15, 2012.

In one preferred embodiment, electrical apparatus 314 may preferably include an array of coloured light emitting diodes (LED) capable of generating a spectrum of different colours through a process of colour mixing. Colour mixing typically involves generating a specific colour through varying the intensity or light output of a combination of red, green and blue LEDs. While the present invention anticipates the ability to use an array of coloured LEDs, it is not specifically limited to the use of red, green and blue LEDs, and may use any mixture of white and/or coloured light emitting technologies in order to achieve the desired colour mixing and spectrum capabilities.

In order for a user to chose or vary a colour, the Product App preferably provides a visual interface that represents an approximation of the spectrum of colours an attached lighting element is able to generate. Where a user selects a colour in the Product App, the Product App preferably calculates the intensity of the component colours in the attached lighting element needed to deliver an approximation of the user's chosen colour at the current brightness level. Product App preferably commands system microcontroller 308 through interchangeable module 200 to vary power control circuits 312 to supply the necessary power to each component colour in attached lighting element in order to generate a lighting colour closest representing the approximation chosen by the user in the Product App.

In one preferred embodiment, calculation of component colour mixing may preferably be handled by system microcontroller 308 rather than the Product App.

In one preferred embodiment, an electrical apparatus 314 in the form of a lighting element, may include an array of segmented light emitting technologies, the intensity of light from which can preferably be separately and individually controlled by system microcontroller 308 and power control circuits 312.

In one preferred embodiment, power control unit 300 may preferably include sensor module 306. As shown in FIG. 2, sensor module 306 preferably includes an ambient light sensor and a proximity detector. Unless otherwise mentioned, sensor module 306 will be described as if including an ambient light sensor and a proximity detector, though the invention is not so limited. It can be appreciated that the automation of a range of tasks can be greatly facilitated by the accurate measurement of ambient light and the setting of thresholds that system microcontroller 308 can use to determine if a trigger event has occurred in order to actuate power control circuit 312. By way of example only, this could be setting an ambient light level as a threshold for turning lights or other devices connected to power control circuit 312 on and off at dusk and/or dawn. By way of another example, this could be setting an ambient light level as a threshold for lowering or raising a mechanised blind or awning.

In one preferred embodiment, a user through the Product App is preferably able to set an ambient light threshold that system microcontroller 308 can use as a trigger for executing an associated task. The ambient light threshold may be pre-stored in the Product App, or the Product App through a wireless communications link with power control unit 300 using interchangeable module 200 may take an immediate ambient light measurement from sensor module 306 to use as a threshold. Any ambient light levels set in the Product App as a threshold are preferably stored in the non-volatile memory of power control unit 300 and can be used by system microcontroller 308 to actuate power control circuit 312 when system microcontroller 308 determines that sensor module 306 is reporting the conditions matching a threshold for a trigger event.

System microcontroller 308 is preferably able to process multiple different thresholds, triggers, and sequencing which may be combined with time based modifiers; filters; and/or processes designed to reduce the likelihood of false positive conditions. By way of example only, system microcontroller 308 may be programmed by the Product App to actuate power control circuit 312 at a specified ambient light threshold. System microcontroller 308 preferably analyses measurements from sensor module 306 over a period of time to ensure the ambient light threshold has been met and is not being caused by an intermediate condition such as something temporarily covering sensor module 306. By way of another example, system microcontroller 308 may be programmed by the Product App to only use a threshold as a trigger event after a particular time of day. In that way, a user could set a power control unit to only use ambient light measurements after say 5 pm. By way of another example, where sensor module 306 includes spectral analysis capabilities, a threshold may be specified based on spectral analysis of an ambient light measurement. This is a form of filtering known by those skilled in the art that allows an ambient light threshold to be determined from the level of natural light without interference from artificial lighting. By way of another example, system microcontroller 308 may be programmed to turn power control circuit 312 on at a specified ambient light threshold and off at a different ambient light threshold using a time based modifier. This could be by way of setting an actual time of day at which measurement for different thresholds occur, or specifying a period of time after one threshold event that system microcontroller 308 starts scanning for the next threshold event.

In one preferred embodiment the sensor module is preferably a single integrated component, however in some embodiments it may be preferable to use a discrete ambient light sensor and/or a discrete proximity sensor. In some preferred embodiments, the proximity detector may be omitted and replaced with a button or switch. In some preferred embodiments, the ambient light sensor may be omitted.

In one preferred embodiment, sensor module 306 may initiate any task that may otherwise be performed by a mechanical or electro-mechanical switch. By way of example only, a power control unit 300 may be programmed by the Product App to monitor the proximity detector in sensor module 306 for a proximity event such as a user's hand approaching and/or touching power control unit 300 that system microcontroller 308 can use as a trigger to actuate power control circuit 312 in varying power supplied to electrical apparatus 314 as though a mechanical switch had been used. A proximity event may be the detection of proximity less than a predetermined proximity threshold such as proximity within predetermined distance from the proximity detector. The predetermined distance may be configured as, for example only, anywhere within in a single room, hallway, corridor or open area within a building. The predetermined distance may be specifically calibrated for a range from the proximity detector, for example from 1 cm to 1 m, or more preferably between 0 cm to 15 cm. On detection of a proximity event, system microcontroller 308 may actuate power control circuit 312 to supply power to electrical apparatus 314 for a user defined period of say 30 mins. In that way, and by example only, a power control unit could be used to activate something like a light for a set period of time when a user touches or is detected by the power control unit, thereby saving considerable power by not running the lighting continuously.

It can be appreciated that a number of sophisticated and complex automation and control schemes can be programmed into power control unit 300 by combining the processing capabilities of system microcontroller 308 with the timing capabilities of perpetual clock calendar 304 and sensing capabilities of sensor module 306.

In one preferred embodiment, power control unit 300 may not include a sensor module 306.

In one preferred embodiment, power control circuits 312 may include a single semiconductor switch, or relay, or electro-mechanical relay configured to vary the supply of power to a single electrical apparatus 314 in a simple on/off fashion. In another preferred embodiment, power control circuits 312 may include a number of semiconductor switches, or relays, electro-mechanical relays, or any other suitable switching or power control technologies configured to vary the supply of power to various electrical apparatus, or elements within an electrical apparatus, in an a simple on/off fashion. An example of an electrical apparatus with controllable elements includes a lighting luminaire formed from an array of individually controllable lighting emitting sources. In another preferred embodiment, power control circuits 312 may include a dimming control or controls. A dimming control is used to vary the amount of power transferred to a lighting element, or a component of a lighting element, where they have the appropriate characteristics to allow the light output to be varied anywhere from fully on to fully off, or some intermediate range of light if appropriate, as directed by system microcontroller 308. Using dimming in power control circuits 312 under the control of system microcontroller 308, the amount of electrical power transferred to lighting element in an electrical apparatus 314 can be regulated. Because the electrical load presented to the dimming control can be resistive, inductive or capacitive, depending on the light type and arrangement, the dimming unit can provide leading edge, trailing edge, pulse width modulation or other suitable methods of variable power control.

In one preferred embodiment, power control unit 300 may not contain any embedded power control circuits 312 and interface entirely with external power control circuits allowing for a custom number and type of circuits to meet the particular requirements of the application at hand.

Where power control unit 300 controls external power control circuits, it may do so through a physical connection (for example only, a wired connection) or may alternately use a wireless communications link. The use of a wireless communications link may require the addition of a supporting radio that may be a transmitter only, or a transmitter and receiver, depending on the requirements of the external power control circuits. The supporting radio may be configured by system microcontroller 308 to operate at a number of different carrier frequencies. Data could be modulated onto those carrier frequencies such that the encoded data could be received, decoded and acted upon by a compatible radio receiver in a remote power control circuit to operate lights or a device such as, for example only, a door lock, fan, alarm system, boom gate and/or blind system.

The supporting radio may be capable of FSK, GFSK, MSK, OOK or other modulation methods and be able to operate over a wide frequency range including the license free Industrial Scientific and Medical (ISM) frequencies, or may support specific standards such as ZigBee, Z-wave, Thread, CSRmesh or equivalent standards. While these specifications are applicable to most wireless sensor networks, home and building automation, alarm and security systems and industrial monitoring and control, there may be applications where a system compatible transceiver with specific frequency and modulation specifications is required. In these situations, a specific supporting radio could be provided within the embodiment described herein.

It will be appreciated that the power control circuit described above can be extended in many ways without departing from the scope of the present invention. Power control circuit 312 may be configured to control an electrical apparatus such as a blind, shutter, awning, gate, fan, door and lights, allowing power control unit 300 to manage a range of external devices according to programmed schedules, ambient light conditions and/or proximity events.

In one preferred embodiment, power measurement 310 allows the electrical parameters of the electricity transferred through power control circuit 312 to be measured. These parameters are available to system microcontroller 308 and may include instantaneous voltage, current and power, Irms and Vrms, average real and apparent power and energy-to-pulse conversion. Some or all of the measured electrical parameters could be sent to smartphone 10, via a wireless communications link through interchangeable module 200, where Product App would then be able to perform additional calculations or conversions if required and display the results in a graphical format on the smartphone's touch sensitive screen for the user to view. Suitable processing of these parameters allows information such as the instantaneous power being used by an attached device or appliance to be displayed. Power usage over time, total power used and trend analysis are also some of the useful representations of the basic electrical data that are preferably measured and could be displayed to the user. By using the smartphone's Internet capability, the Product App could access a power company's rates and charges, and provide the user with usage and cost comparisons.

The inclusion of power measurement 310 allows more advanced functionality other than simple metering to be offered by power control unit 300. In one preferred embodiment, system microcontroller 308 may continuously measure various electrical parameters through power measurement 310 allowing system microcontroller 308 to detect possible error conditions in order to cause power control circuit 312 to reduce or out power to electrical apparatus 314 to protect both power control unit 300 and the electrical apparatus. In another preferred embodiment, a user through the Product App may cause system microcontroller 308, using power measurement 310, to take a measurement of power control circuit 312 under operational load to establish a normal operating threshold. System microcontroller 308 could periodically or continuously monitor power measurement 310 and cause power control circuit 312 to reduce or cut power to electrical apparatus 314 if a deviation from the normal operating threshold is detected to protect both power control unit 300 and the electrical apparatus and/or report to the Product App any deviation from the normal operating threshold. By way of example only, this could be used to measure the operating load of a group of lights connected to power control circuit 312 and allow a user through the Product App to determine if any lights had failed based on the change in power being consumed rather than having to inspect each luminaire. In one preferred embodiment, the normal operating threshold of an electrical apparatus 314 could be manually entered by a user into the Product App or the Product App could access an external server and download the normal operating threshold values of an electrical apparatus 314, the Product App then preferably transferring the normal operation threshold value or values to system microcontroller 308.

In one preferred embodiment, power control unit 300 may not include any power measurement 310.

It will be appreciated by those skilled in the art that the system described above can be varied in many ways without departing from the scope of the present invention. By way of example only, elements may be aggregated or separated into a single or various SoCs or SiPs. Sensor module 306 may be wired to power control device 300, or wirelessly connected. For example, a sensor module may be located in one portion of a room while the power control device is at another portion of the room. More than one sensor may be utilised. For example, ambient light sensors may be positioned in multiple rooms throughout a structure or building. Sensors other than light or proximity may be used. For example, motion, temperature, magnetic fields, gravity, humidity, moisture, vibration, pressure, electrical fields and/or sound sensors may be utilised if desired. The sensor module may include any combination of light, proximity, motion, temperature, magnetic fields, gravity, humidity, moisture, vibration, pressure, electrical fields and/or sound sensors.

Aspects of the present invention may be used in a variety of environments. For example only, the invention can be adapted for use with lighting, gates, blinds, awnings, garage doors, fans, pools, timers, power outlets, consumer electronics, computers, vehicles, power meters, vending machines and air conditioning systems.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for controlling a user's access to an electrical device or system, said system comprising:
   an interchangeable unit operable for wireless communication with a mobile communications device, said interchangeable unit including an aerial and a radio transceiver, said radio transceiver being configured to communicate with the mobile communications device using a peer-to-peer communications standard;
   a power control unit having a communications interface for communication with said interchangeable unit, a microcontroller, and a power control circuit, said power control circuit being configured to implement a command from said microcontroller to vary power from a mains power connection to the electrical device or system, said microcontroller being configurable by the mobile communications device through said interchangeable unit and said communications interface; and
   an external network processor accessible over a communications network, said external network processor being configured to receive a verification request from the mobile communications device to verify that a user of the mobile communications device is authorized to access said interchangeable unit, said external network processor being configured to send, to the mobile communications device, an authorization confirmation after the user's access to said interchangeable unit is verified as being authorized.

2. The system of claim 1, wherein said external network processor is configured to send a command to the mobile communications device to disable the user's access to said interchangeable unit if the user is determined to be no longer authorized to access said interchangeable unit.

3. The system of claim 1, wherein said interchangeable unit includes at least two power pins and at least one signal pin, said interchangeable unit being configured to physically connect to said communications interface of said power control unit.

4. The system of claim 1, wherein said communications interface is configured to wirelessly receive the command, through said interchangeable unit, to vary the power to the electrical device or system.

5. The system of claim 1, wherein the peer-to-peer communications standard is Wi-Fi Direct.

6. The system of claim 1, wherein said microcontroller is configured to open a peer-to-peer wireless communications link with the mobile communications device by simulating a Wi-Fi access point.

7. The system of claim 1, wherein the peer-to-peer communications standard is Bluetooth.

8. The system of claim 1, wherein the electrical device or system is a lighting system.

9. The system of claim 1, wherein the electrical device or system is a vending machine.

10. A system for controlling a user's access to an electrical device or system, said system comprising:
    an interchangeable unit operable for wireless communication with a mobile communications device, said interchangeable unit including an aerial and a radio transceiver, said radio transceiver being configured to communicate with the mobile communications device using a peer-to-peer communications standard;
    a power control unit having a communications interface for communication with said interchangeable unit, a microcontroller, and a power control circuit, said power control circuit being configured to implement a command from said microcontroller to vary power from a mains power connection to the electrical device or system, said microcontroller being configurable by the mobile communications device through said interchangeable unit and said communications interface; and
    an external network processor accessible over a communications network, said external network processor being configured to receive a verification request from the mobile communications device to verify that a user of the mobile communications device is authorized to access said interchangeable unit, said external network processor being configured to send, to the mobile communications device, an authorization confirmation after the user's access to said interchangeable unit is verified as being authorized, wherein said external network processor is configured to disable, through the mobile communications device, said interchangeable unit so that said interchangeable unit is unable to communicate with said power control unit.

11. A method for reconfiguring, with a mobile communications device and an interchangeable unit in wireless communications with the mobile communications device, a power control unit adapted to vary power to an electrical device or system, the method comprising:
    validating a user's access to the interchangeable unit;
    sending, over a communications network, a confirmation to the mobile communications device that the user is authorized to access the interchangeable unit after the user's access is validated;
    moving the interchangeable unit in close proximity to the power control unit, the power control unit having a microcontroller and a power control circuit configured to vary power to the electrical device or system;
    receiving, at the interchangeable unit, a command from the mobile communications device to reconfigure the microcontroller of the power control unit after the user's access to the interchangeable unit is validated; and
    reconfiguring the microcontroller of the power control unit in accordance with the command received at the interchangeable unit.

12. The method of claim 11, wherein the moving of the interchangeable unit includes physically attaching the interchangeable unit to the power control unit.

13. The method of claim 11, further comprising denying the user operable access to the interchangeable unit if the user's access is not validated.

14. The method of claim 11, further comprising sending a command to the mobile communications device to permanently disable access the interchangeable unit.

15. The method of claim 11, further comprising reconfiguring a portion of the mobile communications device to prevent access to the interchangeable unit by the mobile communications device.

16. The method of claim 11, wherein the command is received at the interchangeable unit using a Wi-Fi Direct communications link with the mobile communications device.

17. The method of claim 11, further comprising opening a peer-to-peer wireless communications link with the mobile communications device by simulating a Wi-Fi access point.

18. The method of claim 11, wherein the command is received at the interchangeable unit using a Bluetooth communications link with the mobile communications device.

19. The method of claim 11, wherein the electrical device or system includes a lighting system.

20. The method of claim 11, wherein the electrical device or system includes a vending machine.

* * * * *